United States Patent Office 3,475,289

Patented Oct. 28, 1969

1

3,475,289

ELECTRODE

Matthew S. Hunter, New Kensington, Pa., assignor to Aluminum Company of America, Pittsburgh, Pa., a corporation of Pennsylvania No Drawing. Filed Mar. 29, 1966, Ser. No. 538,223
Int. Cl. C23b *3/02, 9/02*
U.S. Cl. 204—33 9 Claims

ABSTRACT OF THE DISCLOSURE

A method for producing a new and improved aluminum foil material and the improved foil material are provided. The improved foil exhibits a consistent and reliable improvement in surface area gain in response to etching treatments. The improved method contemplates heating the aluminum stock to at least 950° F. and thereafter cold rolling the stock to a reduction constituting at least 85% of its thickness to impart to the foil a strain hardened temper. To realize the improvement in surface area gain, the foil must be etched in this strain hardened temper.

This invention relates to electrolytic capacitors and more particularly to aluminum electrode foil imparting greatly increased specific capacitance to such. By aluminum here is meant substantially pure aluminum although small amounts of impurities or selected additives may be included.

A capacitor comprises anode and cathode electrodes separated by a dielectric material which may be provided as a coating on one of the electrodes, usually the anode. In an electrolytic capacitor an electrolyte is disposed between at least one of the electrodes and the dielectric material. In the capacitor art it has long been known that substantial economy results if the effective surface area or specific capacitance of an electrode member is increased since a selected capacitance level can be achieved with the use of less electrode foil material. Electrochemical etching is most frequently employed for this purpose although mechanical roughening and chemical etching have been known for this purpose.

Conventional capacitor foil is generally produced in a fabrication sequence which includes, as a final metal working operation, a cold rolling step whereby the metal is significantly reduced in thickness at substantially room temperature. This produces a very hard foil which is then annealed for convenience in handling and processing. The prior art, as shown in U.S. Patent 2,168,135, has attempted to realize some gain by etching the foil in the hard temper without annealing. However, this technique never really achieved popular or commercial acceptance. The most probable reason is that the results are highly inconsistent and unreliable. While the capacitance is sometimes improved, just as often there is little or no gain or, even worse, the capacitance shows a decrease in comparison with that of annealed foil. This unreliability is intolerable in commercial operations which require a high degree of consistency and manufacturers of commercial capacitors currently etch aluminum foil in the annealed temper so as to realize the highly repeatable results associated therewith.

Most of the current effort in the art to further improve capacitance is directed to refinements in etching and other related processes. The degree of improvement realized here is generally not very profound, and accordingly, an increase of 10% in capacitance, repeatable on a commercial scale, is considered a rather significant improvement. A 20% improvement is considered extremely beneficial.

Accordingly it is an object of the invention to provide

2 for aluminum capacitor electrode foil having markedly improved capacitance in response to etching treatments. A still further object is to achieve this improvement in a reproducible and repeatable fashion.

Other objects and advantages of the invention will, in part, appear hereinafter.

The invention contemplates the novel combination of a thermal treatment together with etching in the hard temper. The thermal treatment must precede the cold working operation and consists of heating the electrode material at a temperature of at least 950° F. The cold reduction corresponds to at least 85% of the electrode material thickness before cold rolling. This combination produces, quite unexpectedly, gains in capacitance of 10% or 20%, or more, which gains are realized consistently and, accordingly are highly adapted to commercial usage.

Aluminum foil used in electrolytic capacitor electrodes consists of at least 99.45% aluminum but may contain minor amounts of impurities, primarily iron and silicon, and in some cases deliberate additions for special purposes. However, for all practical purposes, the alloy is considered substantially pure aluminum or at least unalloyed aluminum in the popular sense. Such compositions are not normally considered as receiving any benefit from high temperature thermal treatments except possibly annealing after fabrication. While the invention contemplates an aluminum foil composition of at least 99.45% aluminum, on a preferred basis the foil contains at least 99.75% aluminum as the improvements in capacitance here are particularly good.

The foil contemplated by the invention is produced by normal metal working steps such as hot and continuous rolling of a scalped ingot or other suitable stock to produce a sheet. The sheet receives a cold reduction of at least 85%, and preferably at least 90% to produce the foil. Yet further capacitance improvements can be realized by increasing the cold reduction to 95% or more. Cold reductions of this magnitude impart to the resultant foil an internal structure which permits the development of very significantly improved capacitance in response to etching treatments provided the cold reduction is preceded by the thermal treatment as provided herein. By a cold reduction is meant a reduction performed at a temperature which does not soften or anneal the metal. Bearing in mind that cold working inherently increases the metal temperature, care should be exercised so that the peak value does not exceed 400° F. and never gets close to the annealing level, about 600° F. The final thickness of the foil ranges from 0.001 inch to 0.008 inch, preferably between 0.001 and 0.004 inch before etching. In the practice of the invention it is critical that the foil be etched while in this hard temper.

As indicated at the outset of this description, etching in the cold hard temper, in itself, i.e. without the thermal treatment described herein, is not commercially employed in the electrolytic capacitor industry because of the lack of any reliable capacitance gain or improvement associated therewith. For instance, a number of aluminum capacitor foil lots, totaling over 30,000 pounds, were etched in the hard temper and the resultant capacitance determined. The foil here was of high purity, 99.99% or more aluminum and was not thermally treated as described herein. A comparison of the capacitance with that of a standard consisting of identical foil etched in the annealed condition, revealed that none even came up to the performance of the annealed foil standard. The capacitance for the hard foil ranged from 2 to 26% below the level of the standard. These results illustrate the lack of reliability generally experienced with aluminum electrode foil etched in the hard temper.

It has been found in accordance with the invention that, quite unexpectedly, this condition is alleviated by the use of a special thermal treatment, not normally associated with the substantially pure aluminum foil used in capacitor electrodes. This thermal treatment, although not particularly complex, is of extreme importance in practicing the invention, and contemplates heating the aluminum electrode material to at least 950° F. at some time before it is finally cold worked. At temperatures significantly below 950° F. the advantages of the thermal treatment are not realized. Higher temperatures are generally preferable although the temperature should not be allowed to reach the melting point of the material being heated. Aluminum capacitor foil metal generally melts around 1200° F. and hence it is advisable that the temperature not be allowed to substantially exceed 1150° F. to provide some margin of safety in commercial practice. A preferred temperature range is 1000–1150° F.; for instance a temperature of about 1100° F. is particularly effective. The temperatures referred to are those actually prevailing within the metal as opposed to furnace temperatures. The minimum time required varies in an inverse fashion with temperature and generally falls between 3 minutes and 2 hours according to the relation:

$$t_{\min}=\frac{120}{2^{\frac{(T-900)}{50}}}=\frac{120}{2^{(0.02T-18)}}$$

where $t_{\min}$ is the minimum time in minutes and T is the temperature in ° F. There is no critical maximum time limit, and accordingly it will often be more convenient in commercial practice to use a minimum time of 2 or 4 hours or more.

After this thermal treatment the material is cold worked by a final reduction of at least 85% of its thickness as described earlier. If desired, other fabricating steps, such as hot or cold working, can be introduced between the thermal treatment and final cold rolling operation. Alternatively, these operations can precede the thermal treatment. Also, any intermediate cold working cycles introduced before the final cold rolling step can themselves include intermediate annealing steps. While these other steps may exert some degree of influence, the internal structure of the foil is regarded as substantially that derived by the thermal treatment and the subsequent drastic cold reduction of 85% or more.

As already suggested, aluminum electrode material can be initially prepared in any manner. However direct chill cast ingot is preferred. The ingot surfaces are prepared for subsequent working operations by scalping, etc., to the extent required for proper foil quality, as is understood in the art. A typical sequence includes the novel thermal treatment at 1100° F. for four hours of an ingot about 12 inches thick followed by hot rolling at about 700° to 800° F. to a thickness of about ⅛ inch. This sheet is allowed to cool to room temperature and then cold rolled by a reduction of over 97% to produce foil about 0.003 inch thick and in the so-called extra hard temper. If desired, the hot rolling operation might produce a plate 5/16 inch thick and the plate be then cold rolled to produce the ⅛ inch thick sheet. This sheet is then annealed to enable it to sustain the drastic 97 plus percent final cold rolling step in producing the foil. This intermediate cold rolling and annealing cycle does not, as construed herein, appreciably alter the internal structure of the foil which remains substantially that derived from the thermal treatment and the drastic final cold rolling step.

While the improvements described herein are attributed to the combined effects of the heat treatment and etching in the hard temper, the exact reasons for such are not completely understood. All that is certain is that these effects combine in producing an internal structure in the foil which very markedly improves its response, by way of increased capacitance, to etching treatments. Omitting either forfeits the improvements in accordance with the invention.

The foil while in the hard temper is then etched in the manner customary in the art. Electrochemical etching processes are preferred over chemical methods although the particular etching procedure is not especially critical and those skilled in the art are highly knowledgeable with respect to etching solutions and other variables which need not be elaborated upon here. One etching bath which has been employed consists of a 26% solution of sodium chloride in water. This solution is used in electrochemical etching with a current density of preferably about 4.8 amps per square inch at 195° F. temperature. Etching time is one and a half minutes. In this connection it might be noted that the current density range employed in the electrolytic capacitor art normally falls between 2 and 10 amps per square inch and it is within this range that foil as provided herein may be etched with particularly good results by way of improvement over like foil etched in the annealed condition.

The etched foil, where intended for use as the capacitor anode, is generally then anodized, i.e. coated with an electrolytically formed oxide film, to provide an adherent dielectric material. In the capacitor art this anodizing process is referred to as forming. This may be effected in various electrolytes as is known by those practicing the art. One typical electrolyte contains 3% tartaric acid in a water solution adjusted to a pH of about 5.5 by the addition of ammonium hydroxide. The forming voltage should always be at least equal to the maximum voltage contemplated in operation to assure no breakdown under slightly higher voltage surges and to improve other characteristics such as leakage. These characteristics are generally associated with the stability of the oxide film and hence the coating is referred to as stable for operation at a predetermined maximum voltage level. For example, in commercial practice, foil intended for use in a capacitor operating at 100 volts may be formed at a voltage slightly in excess of that level, for instance 115 to 120 volts. This provides some safety factor in the stability coating.

It is in this last connection that the intended capacitor operating voltage might introduce some limitations in the practice of the invention. Generally speaking, higher forming voltages can impair the surface area improvement, and the capacitance gain associated therewith, achieved by etching the improved foil. Under the present state of the etching and forming arts, the improved foil yields best results if not formed for use with more than 100 volts, although very substantial improvements are realized up to 200 volts. Since there is no reason to believe that etching practices will not improve, these voltage levels are not necessarily intended to limit the invention. Thus, the invention contemplates forming the improved etched electrode foil to provide a dielectric coating which is stable at the maximum expected operating voltage. This voltage, because of the current state of the etching and forming arts, is at present preferably limited to 200 volts, or still better, 100 volts or less.

In most cases only the capacitor anode foil is both etched and formed although often the cathode can be etched to significant advantage. The invention contemplates use of the improved foil in either cathode or anode members, although the advantages of the invention will often be more appreciated in the anode member.

One measure commonly used in the capacitor art to compare the effectiveness of etching procedures or other factors influencing capacitance is the capacitance gain. This is a ratio of the capacitance per square inch of the etched foil as compared with unetched foil formed at the same voltage. By way of illustration of the capacitance gain realized in practicing the invention, several samples of foil containing a minimum of 99.99% aluminum were tested. Table I lists the capacitance in microfarads (mfd.), for (1) unetched foil, (2) foil etched in the annealed condition and (3) the improved foil. All the samples were formed at 30 volts. The etched samples were electrochemically etched for 1½ minutes, at a current density of 4.8 amps per square inch, in an electrolyte consisting of a water solution containing 26% sodium chloride at about 195° F.

TABLE I

| Sample | Capacitance (mfd. per sq. in.) | Gain |
|---|---|---|
| (1) Unetched | 2.5 | |
| (2) Annealed, etched | 46 | 18.4 |
| (3) Improved foil, etched | 65 | 26 |

Table I illustrates quite clearly that while the gain for the annealed standard, 18.4, is substantial, the gain for the improved foil represents a 40% improvement over this level. Note also that, as described earlier, foil of the same composition etched in the hard temper, but without the special heat treatment, generally shows little, or more often, no improvement over the etched and annealed standard. In a considerable number of similar tests, the improved foil has consistently demonstrated an improvement of at least 20% over like foil not improved as provided herein.

Another important feature contemplated in practicing the invention is that the foil may be annealed subsequent to etching without any substantial loss in capacitance. This renders the foil much easier to handle in subsequent operations such as oxide film forming, coiling, cutting and winding into capacitors. The etched foil may be annealed at 500 to 700° F. to soften it without any substantial loss in capacitance. As is known, such an annealing step causes the internal structure of the foil to recrystallize. Thus the invention contemplates subjecting the improved foil, having an internal structure substantially derived by the heat treatment and 85% minimum cold reduction, to an etching treatment to increase its surface area and subsequently recrystallizing this internal structure by annealing.

The following examples illustrate the advantages of the invention.

EXAMPLE 1

Seven lots, totaling about 12,000 po unds of metal containing a minimum of 99.88% aluminum with a maximum limit of 0.06% on any other element were fabricated into aluminum electrode foil. The ingots, initially about twelve inches thick, were first heated at 1100° F. for 4 hours and then hot and continuous rolled to a sheet thickness of approximately ⅛ inch which was then cold rolled to a foil thickness of about 0.004 inch. This extra hard foil was then electrolytically etched for one and a half minutes in a bath consisting of a water solution containing 200 grams per liter of sodium chloride, at a temperature of about 195° F. and at a current density of 4.8 amps per square inch. This foil was then formed in the earlier mentioned adjusted tartaric acid solution at 30 volts and the capacitance measured. Along with these lots was included an annealed foil control standard etched and formed identically. The foil etched in the hard temper exhibited a capacitance improvement over the annealed foil standard of from about 60 to 75%. It can be readily seen that, not only is this a very substantial improvement but that it can be achieved on a commercial lot basis in a reliable and repeatable manner.

EXAMPLE 2

In another comparison, aluminum electrode ingot material containing at least 99.97% aluminum and not more than 0.01% of any other element was fabricated into foil as follows. Ten ingots were heated between 1000 and 1100° F. for 4 hours. Two more ingots were heated to about 850° F. before fabrication. The ingots were then hot and continuous rolled from an initial thickness of about 12 inches to a sheet thickness of about 0.115 inch. These sheets were then annealed at 650° F. for 5 hours. After cooling to room temperature the sheets were cold rolled to a foil thickness of 0.003 inch, a cold reduction of over 97%. The foil was then etched and formed and its capacitance compared to that of an annealed standard, identically etched and formed. The capacitance for the foil thermally treated at 1000 to 1100° F. ranged from 62 to 95% above that of the annealed standard. The capacitance of the foil produced from the ingots which had been heated to only 850° F. generally ranged about 15% below the level of the annealed standard.

Having thus described the methods of the invention, I claim:

1. The method of producing aluminum capacitor electrode foil comprising:
   (1) providing a body composed of at least 99.45% aluminum
   (2) heating said body at a temperature of at least 950° F.
   (3) thereafter cold rolling said body to provide hard foil, said cold reduction constituting at least 85% of the body's thickness prior to cold rolling said hard foil being characterized by a highly reliable and marked improvement in response to etching treatments by way of increased surface area and capacitance.

2. The method according to claim 1, wherein said body is heated at a temperature of from 1000° to 1150° F.
3. The method according to claim 1, wherein said body contains at least 99.75% aluminum.
4. The method according to claim 1, wherein the cold reduction constitutes at least 90% of the body's thickness prior to cold rolling.
5. The hard foil produced by the method of claim 1.
6. A method of producing an aluminum electrode member for an electrolytic capacitor comprising:
   (1) heating at a temperature of at least 950° F. a body composed of at least 99.45% aluminum
   (2) thereafter cold rolling said body to provide hard foil, said cold rolling resulting in a cold reduction constituting at least 85% of the body's thickness prior to cold rolling
   (3) etching said hard foil to provide an etched surface.
7. The method according to claim 6 wherein the hard foil, subsequent to etching, is annealed to recrystallize its internal structure.
8. The method according to claim 6 wherein said etched surface is provided with a tightly adherent electrolytically formed oxide coating.
9. The etched foil produced by the method of claim 6.

References Cited

UNITED STATES PATENTS

| | | | |
|---|---|---|---|
| 2,106,178 | 1/1938 | Keller et al. | 148—159 |
| 2,218,076 | 10/1940 | Werner | 156—22 XR |
| 2,755,237 | 7/1956 | Turner | 204—33 |
| 2,941,930 | 6/1960 | Mostouych et al. | 204—29 |
| 2,995,478 | 8/1961 | Keller et al. | 148—11.5 |
| 3,197,347 | 7/1965 | Altenpohl | 148—20.3 |
| 3,219,491 | 11/1965 | Anderson et al. | 148—11.5 |

JOHN H. MACK, Primary Examiner

W. B. VANSISE, Assistant Examiner

U.S. Cl. X.R.

29—18; 148—13.1, 159; 156—22; 204—58, 141